US012600457B2

(12) United States Patent
Iorga et al.

(10) Patent No.: US 12,600,457 B2
(45) Date of Patent: Apr. 14, 2026

(54) AIRCRAFT WINGS

(71) Applicants: Airbus Operations Limited, Bristol (GB); Dapta Ltd, Bristol (GB)

(72) Inventors: Nicolae Lucian Iorga, Bristol (GB); Olivia Stodieck, Bristol (GB)

(73) Assignees: Airbus Operations Limited, Bristol (GB); Dapta Ltd, Bristol (GB)

( * ) Notice: Subject to any disclaimer, the term of this patent is extended or adjusted under 35 U.S.C. 154(b) by 0 days.

(21) Appl. No.: 19/175,603

(22) Filed: Apr. 10, 2025

(65) Prior Publication Data

US 2025/0319959 A1    Oct. 16, 2025

(30) Foreign Application Priority Data

Apr. 12, 2024    (GB) ...................................... 2405255

(51) Int. Cl.
*B64C 3/52* (2006.01)
*B64C 3/14* (2006.01)
*B64C 3/18* (2006.01)

(52) U.S. Cl.
CPC ................. *B64C 3/52* (2013.01); *B64C 3/14* (2013.01); *B64C 3/185* (2013.01)

(58) Field of Classification Search
CPC .............. B64C 3/52; B64C 3/38; B64C 3/185
See application file for complete search history.

(56) References Cited

U.S. PATENT DOCUMENTS

| | | | |
|---|---|---|---|
| 7,607,617 B2 | 10/2009 | Law | |
| 8,838,298 B2 | 9/2014 | Hinnant et al. | |
| 9,856,012 B2 | 1/2018 | Xi et al. | |
| 11,772,780 B2 | 10/2023 | Iorga | |
| 2019/0127043 A1 | 5/2019 | Krog et al. | |
| 2022/0340266 A1* | 10/2022 | Iorga | B64C 3/185 |

FOREIGN PATENT DOCUMENTS

| | | |
|---|---|---|
| EP | 3476719 A1 | 5/2019 |

OTHER PUBLICATIONS

Search Report and Examination Report corresponding to GB2405255. 7, dated Aug. 22, 2024, 6 pages.
Jutte, C. et al., "Static Loads Testing of a High Aspect Ratio Tow-Steered Wingbox", AIAA Scitech 2020, 21 pages.

(Continued)

*Primary Examiner* — Nicholas McFall
*Assistant Examiner* — Eric Acosta
(74) *Attorney, Agent, or Firm* — Sterne, Kessler, Goldstein & Fox P.L.L.C.

(57) ABSTRACT

An aircraft wing (3) comprising an aerofoil structure (5) is disclosed. The aerofoil structure (5) comprises a load-carrying member (10) having stiffness properties selected such that the load-carrying member (10) twists in a pre-defined manner in response to bending of the load-carrying member (10). The aerofoil structure (5) further comprises an actuator (15A, 15B) which is fixedly mounted to the load-carrying member (10) and which is operable to bend the load-carrying member (10) to thereby cause the load-carrying member (10) to twist. An aircraft comprising the aircraft wing and a method of adjusting the twist in an aircraft wing are also disclosed.

14 Claims, 5 Drawing Sheets

(56) References Cited

OTHER PUBLICATIONS

Locatelli, D. et al., "Wing-Box Weight Optimization Using Curvilinear Spars and Ribs (SpaRibs)", Journal of Aircraft, vol. 48, No. 5, Sep.-Oct. 2011; Published Online: May 22, 2012 https://doi.org/10.2514/1.C031336.

Stodieck, O., "Tech-Insight: Aeroelastic tailoring of wings using a Z-beam concept", EPSRC Tech Insight, 3 pages.

Giurgiutiu, V., "Actuators and Smart Structures", Encyclopedia of Vibration, 2001, pp. 58-81.

Moses, Robert W., "Vertical Tail Buffeting Alleviation Using Piezoelectric Actuators—Some Results of the Actively Controlled Response of Buffet-Affected Tails (ACROBAT) Program", NASA Technical Memorandum 110336, 1997, 22 pages.

Keats, W. et al., Aeroelastic analysis of the NASA/ARMY/MIT active twist rotor, American Helicopter Society, Forum 55, 1999, 13 pages.

* cited by examiner

AIRCRAFT WINGS

BACKGROUND OF THE INVENTION

The present disclosure relates to wings for fixed-wing aircraft. More particularly, the present invention relates to a wing comprising an aerofoil structure configured to twist in a predefined manner in response to bending of a load-carrying member of the aerofoil structure by an actuator. The invention also relates to a method of adjusting the twist in an aircraft wing.

Aircraft will generally be flown across a range of varying missions. For each mission flown by the aircraft, there will be an optimum wing shape where the amount of fuel required for that particular mission is minimised. However, the shape of the main wing box of an aircraft wing tends to be fixed. The wings of a particular aircraft will therefore typically be designed to best fit the range of missions that the aircraft might be used for. As such, the aircraft will not always be flown under conditions for which its wings are aerodynamically optimal.

There is a desire to provide aircraft with wings that can be aerodynamically adapted to suit different missions. Tailoring wings to suit a specific mission profile could reduce the fuel burn associated with that particular mission, which in turn may reduce the environmental impact and cost of that mission.

The present invention seeks to mitigate one or more of the above-mentioned problems.

SUMMARY OF THE INVENTION

The present invention provides, according to a first aspect, an aircraft wing comprising an aerofoil structure. The aerofoil structure comprises a load-carrying member; a leading-edge structure forming a leading-edge part of an aerodynamic surface of the aerofoil structure, fixedly mounted to the load-carrying member; and a trailing-edge structure forming a trailing edge part of the aerodynamic surface, fixedly mounted to the load-carrying member. The load-carrying member comprises a beam formed by a first chordwise member, a second chordwise member, and a diagonal member connected in series. The first chordwise member extends from the trailing-edge structure to the leading-edge structure. The second chordwise member extends from the trailing-edge structure to the leading-edge structure, the second chordwise member being spaced apart from the first chordwise member in the spanwise direction. The diagonal member extends both in a spanwise direction and a chordwise direction from the trailing-edge structure to the leading-edge structure and connects the first chordwise member and the second chordwise member. The load-carrying member has stiffness properties selected such that the load-carrying member twists in a predefined manner in response to bending of the load-carrying member. The aerofoil structure further comprises a first actuator which is fixedly mounted to the load-carrying member and which is operable to bend the load-carrying member to thereby cause the load-carrying member to twist.

The aircraft wing of the first aspect of the invention is for use on fixed wing aircraft. For example, the aircraft wing may be used on a fixed-wing passenger aircraft or an unmanned aerial vehicle (UAV). The load-carrying member, and therefore the aerofoil structure, is configured to twist in a predefined manner in response to bending of the load-carrying member. Therefore the actuator enables adjustment of the twist of the aircraft wing. By enabling adjustment of the twist of the wing, an improved or optimum wing twist can be employed for a particular mission flown by the aircraft or for a particular phase of flight.

The first chordwise member may be substantially aligned with the chordwise direction. The second chordwise member may be substantially aligned with the chordwise direction. The first chordwise member may be oriented substantially parallel with the second chordwise member.

A first end and a second end of the first actuator may be fixedly mounted to the load-carrying member. The first actuator may be configured to move the first end with respect to the second end to bend the load-carrying member. The actuator may be configured to move the first end towards or away from the second end. The load-carrying member may comprise a beam having a lower flange and an upper flange connected by a web. For example, the beam may have an "I"-shaped cross-section comprising an upper flange and a lower flange connected by a web. In embodiments, the cross-sectional shape of the beam of the load-carrying member may be square, rectangular, C-shaped, or Z-shaped, or any other suitable shape.

At least one of the first end or the second end of the first actuator may be fixedly mounted to the lower flange or to the upper flange. At least one of the first end or the second end of the first actuator may be fixedly mounted to the web. At least one of the first end or the second end of the first actuator may be fixedly mounted to the web and to one of the lower flange or upper flange. An upper cover of the aerofoil structure may be mounted to the upper flange. A lower cover of the aerofoil structure may be mounted to the lower flange. Both of the respective first end and the respective second end of the first actuator may be fixedly mounted to the lower flange. Alternatively, both of the respective first end and the respective second end of the first actuator may be fixedly mounted to the upper flange. Both of the respective first end and the respective second end of the first actuator may be fixedly mounted to the web.

At least one of the first end or the second end of the first actuator may be fixedly mounted to the load-carrying member via a joint which permits the at least one end of the actuator to move with at least two rotational degrees of freedom with respect to the load-carrying member. The joint may permit the at least one end of the actuator to move with three rotational degrees of freedom with respect to the load-carrying member. The joint may, for example, be a ball joint. Both the first and second end of the first actuator may be fixedly mounted to the load-carrying member via respective joints permitting the respective ends of the actuator to move with at least two rotational degrees of freedom with respect to the load-carrying member. The respective joints may permit the respective ends of the actuator to move with three rotational degrees of freedom with respect to the load-carrying member. Alternatively, one of the joints may be configured to permit movement in fewer rotational degrees of freedom than the other.

The first end and the second end of the first actuator may be fixedly mounted to the diagonal member. The first actuator may therefore be configured to exert a tensile or compressive load along the length of the diagonal member to thereby bend the load-carrying member. The first actuator may be positioned to one side of a neutral axis of the diagonal member. The first end of the first actuator may be fixedly mounted to the first chordwise member and the second end of the first actuator may be fixedly mounted to the second chordwise member. The first actuator may pass through an opening formed in the diagonal member. The first actuator may therefore be configured to pull the first chordwise member and the second chordwise member towards one another or to push the first chordwise member and the second chordwise member away from one another to thereby bend the load-carrying member.

The first actuator may be any suitable type of actuator. In some embodiments, the actuator is a linear actuator. For example, the actuator may be a linear hydraulic actuator or a screw-driven actuator.

The aircraft wing may comprise a second actuator. The first end and the second end of the first actuator may be fixedly mounted to the load-carrying member towards the upper cover. A first end and a second end of the second actuator may be fixedly mounted to the load-carrying member towards the lower cover. The second actuator may be operable to impose an opposing displacement on the load-carrying member to the displacement imposed by the first actuator. The second actuator may be configured to move the first end with respect to the second end to bend the load-carrying member. For example, when the first actuator is operated to move its first end towards its second end, the second actuator may be operated to move its first end away from its second end. Conversely, when the first actuator is operated to move its first end away from its second end, the second actuator may be operated to move its first end towards its second end. The second actuator may have any of the features described herein with respect to the first actuator. In embodiments of the invention, there may be more than two actuators configured to bend the load-carrying member. As used herein, "towards the upper cover" should be understood to mean closer to the upper cover than to the lower cover. As used herein "towards the lower cover" should be understood to mean closer to the lower cover than to the upper cover.

The first end and the second end of the second actuator may be fixedly mounted to a diagonal member. Where the load-carrying member comprises a web, one of the actuators may be positioned on a first side of the web and the other of the actuators may be positioned on a second side of the web. The first end of the second actuator may be fixedly mounted to the first chordwise member and the second end of the second actuator may be fixedly mounted to the second chordwise member. The second actuator may pass through an opening formed in the diagonal member. The opening may be the same opening through which the first actuator passes or, alternatively, the opening may be a separate opening in the diagonal member.

The aerofoil structure may further comprise an upper cover fixedly mounted to the load-carrying member, the upper cover forming an upper part of the aerodynamic surface of the aerofoil structure. The aerofoil structure may further comprise a lower cover fixedly mounted to the load-carrying member, the lower cover forming a lower part of the aerodynamic surface of the aerofoil structure. At least one cover may be fixedly mounted to the load-carrying member by an adhesive or by fasteners, for example. In some embodiments at least one cover may be fixedly mounted to the load-carrying member by being integrally formed with the load-carrying member.

The aircraft wing may comprise a fuel tank extending in a spanwise direction and a chordwise direction within the wing. The aerofoil structure may be positioned between the fuel tank and a tip of the wing.

According to a second aspect, the present invention provides an aircraft comprising an aircraft wing in accordance with the first aspect of the invention and a control system. The aircraft is a fixed wing aircraft. For example, the aircraft may be a passenger aircraft or an unmanned aerial vehicle. The control system is configured to operate the first actuator to cause the aircraft wing to twist by a predefined amount. Where there is more than one actuator operable to bend an aerofoil structure, the control system may be configured to operate each actuator that is fixedly mounted to the load-carrying member and operable to bend the load-carrying member.

The control system may be configured to operate the actuators while the aircraft is on the ground to achieve a target twist distribution which is optimum for a particular application. Alternatively or additionally, the control system may be configured to operate the actuators in flight. For example, the twist of the wing may be adjusted to an optimal configuration for different phases of flight. Alternatively or additionally, the control system may be configured to effect relatively quick changes in the twist distribution of the wing in response to dynamic events or to control aeroelastic effects.

The aircraft may have two substantially identical wings (the substantially identical wings being substantially mirror images of one another).

The aircraft may comprise a passenger cabin comprising a plurality of rows and columns of seat units for accommodating a multiplicity of passengers. The aircraft may have a capacity of at least 20, more preferably at least 50 passengers, and optionally more than 75 passengers. The aircraft may be a commercial aircraft, for example a commercial passenger aircraft, for example a single aisle or twin aisle aircraft. The aircraft need not be configured for carrying passengers but could for example be an aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

According to a third aspect, the present invention provides a method of adjusting a twist of the wing of the aircraft of the second aspect of the invention. The method comprises operating the first actuator to bend the load-carrying member by a predetermined amount to thereby cause the aerofoil structure to twist by a predetermined amount. The method may comprise operating more than one actuator to bend the load-carrying member (where there is more than one actuator operable to bend the load-carrying member). The step of operating the first actuator to bend the load-carrying member by a predetermined amount may take place while the aircraft is flying. Alternatively, the step of operating the first actuator to bend the load-carrying member by a predetermined amount may take place while the aircraft is on the ground and, in some embodiments, stationary.

The predetermined amount of bending of the load-carrying member may be selected from a plurality of values, each value corresponding to a different predetermined twist configuration of the wing. Each predetermined twist configuration of the wing may be an optimal twist configuration for a particular mission profile for the aircraft. For example, a first twist configuration may be optimal for a first mission profile and a second twist configuration may be optimal for a second mission profile. The second mission profile may, for example, involve a different length of flight and, alternatively or additionally, a different altitude to the first mission profile.

Alternatively or additionally, each predetermined twist configuration of the wing may be an optimal twist configuration for a particular phase of flight. For example, a first twist configuration may be optimal for take-off and a second, different, twist configuration may be optimal for cruise.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
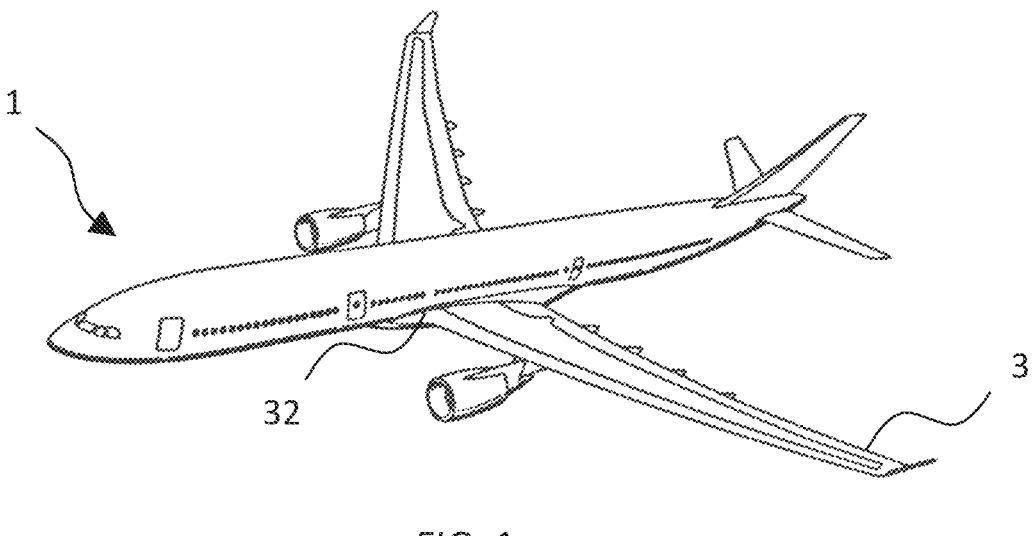
FIG. 1 shows an aircraft according to a first embodiment of the invention.
Figure 2:
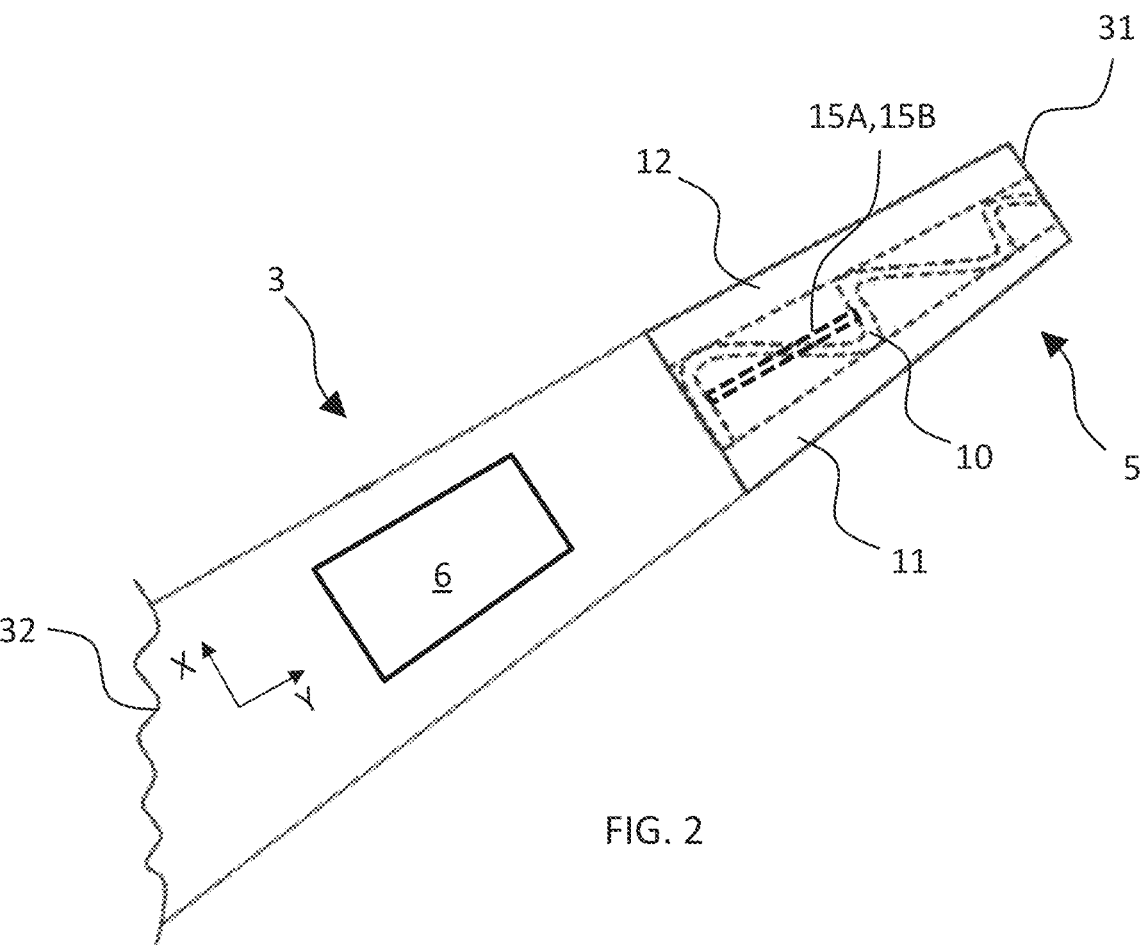
FIG. 2 is a schematic plan view of a wing of the aircraft of FIG. 1.

An aircraft 1 comprising a wing 3 according to an embodiment of the present invention is shown in FIG. 1. The wing 3 comprises an aerofoil structure 5 and a fuel tank 6, as can be seen in FIG. 2. The aerofoil structure 5 is positioned towards the wing tip 31 and the fuel tank 6 is positioned inboard of the aerofoil structure 5, between the aerofoil structure 5 and the root 32 of the wing 3. It will be understood that in, other embodiments of the invention, there may not be a fuel tank within the aircraft wing. This may particularly be the case for smaller aircraft or unmanned aerial vehicles.

Figure 3:
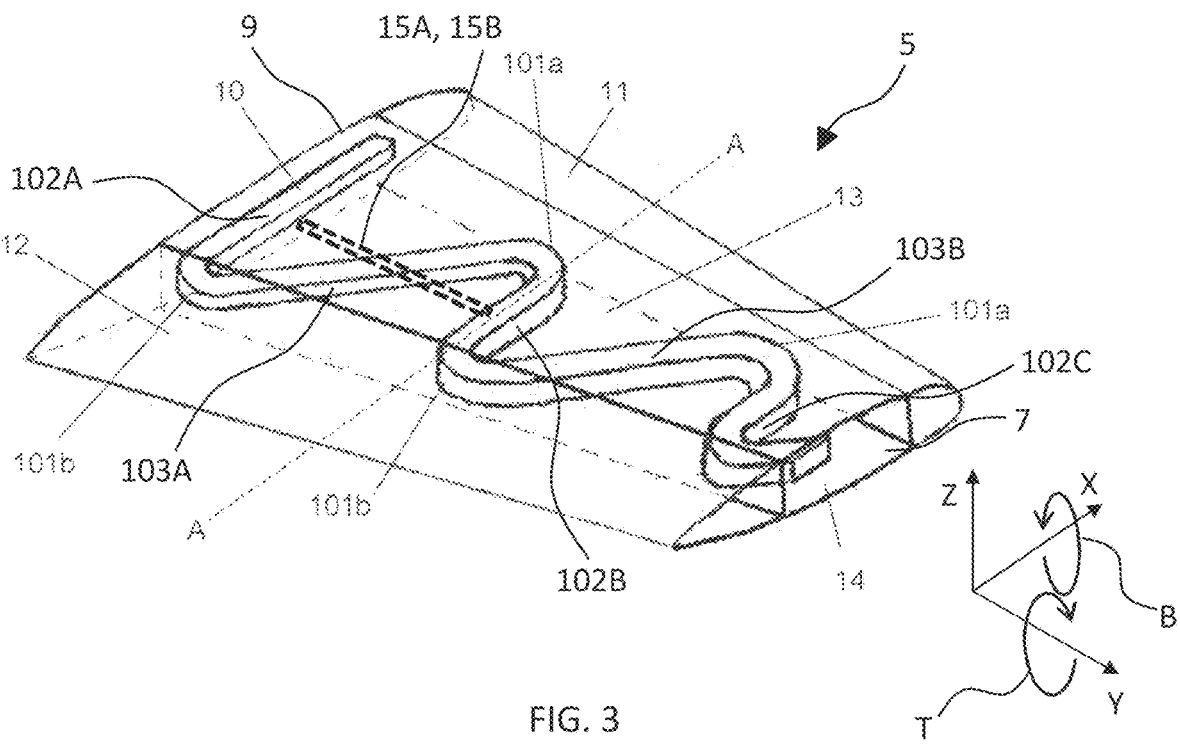
FIG. 3 shows an aerofoil structure of the wing of FIG. 2.
Figure 4:
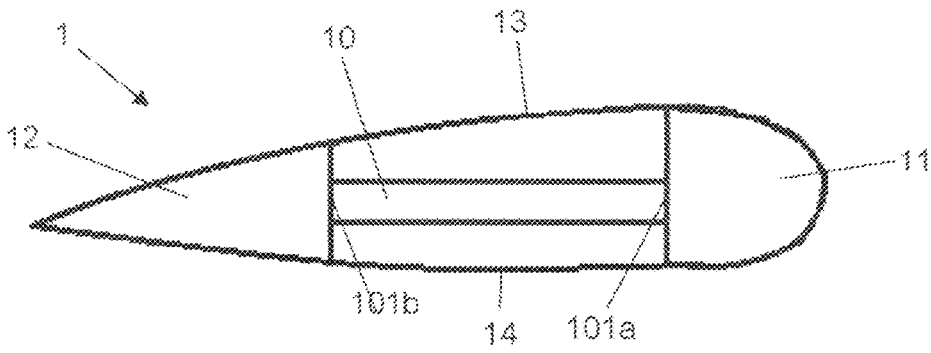
FIG. 4 is a cross-sectional view of the aerofoil structure taken at the location indicated by the line A-A in FIG. 3.

The aerofoil structure 5, which is shown in isolation in FIG. 3 and FIG. 4, is based on the aerofoil structure disclosed in U.S. patent application Ser. No. 17/709,896, which is hereby incorporated by reference. The aerofoil structure 5 comprises a load-carrying member 10 that extends in both a chordwise X direction and a spanwise Y direction of the wing 3. A leading-edge structure 11 is mounted to a leading-edge side (with respect to the intended operational orientation of the wing 3) of the load-carrying member 10 and a trailing edge-structure 12 is mounted to a trailing-edge side of the load-carrying member 10. An upper cover 13 is mounted to an upper side of the load-carrying member 10 and a lower cover 14 is mounted to a lower side of the load-carrying member 10.

The loads experienced by an aircraft wing during flight ("flight loads") are the sum of the aerodynamic lift and drag forces, as well as concentrated and distributed weight of wing-mounted engines, wing-mounted systems, stored fuel and structural elements. The aerofoil structure 5 of the aircraft wing 3 according to the invention may be configured such that more than half of all flight loads experienced by the aerofoil structure 5 are carried by the load-carrying member 10. It may be the case that most of the flight loads are carried by the load-carrying member 10. The other structural members of the aerofoil structure 5 (leading-edge structure, trailing-edge structure, upper cover and lower cover) define the aerodynamic profile (cross-sectional shape) of the aerofoil structure 5 and they may be configured to carry a relatively small proportion of load experienced by the aerofoil structure 5 when the aircraft 1 is in flight.

The load-carrying member 10 is formed by a beam which extends along the aerofoil structure 5 in a "zig-zag" shape. In this case, the load-carrying member 10 is a unitary structure. However, in other embodiments, the load-carrying member may comprise an assembly of substructures. The zig-zag shape of the load-carrying member 10 is formed by a plurality of chordwise members 102A-C connected by a plurality of diagonal members 103A-B. The chordwise members 102A-C are aligned with the chordwise X direction of the wing 3 and extend from the trailing edge structure 12 to the leading-edge structure 11. In this case the chordwise members 102A-C are oriented substantially parallel with one another and are spaced apart in the spanwise Y direction of the wing 3.

The diagonal members 103A-B extend both in a spanwise direction Y and a chordwise direction X of the wing 3, from the trailing-edge structure 12 to the leading-edge structure 11 in a generally diagonal direction with respect to the chordwise members 102A-C. Each diagonal member 103A-B connects a trailing-edge end of a chordwise member 103A-C with a leading-edge end of a neighbouring chordwise member 103A-C. The chordwise members 102A-C and diagonal members 103A-B are connected at forward corner regions 101a and at rearward corner regions 101b of the load-carrying member 10. The leading-edge structure 12 is mounted to the load-carrying member 10 at the forward corner regions 101a and the trailing edge structure 11 is mounted to the load-carrying member 10 at the rearward corner regions 101b as described in U.S. Ser. No. 17/709, 896.

Figure 5:
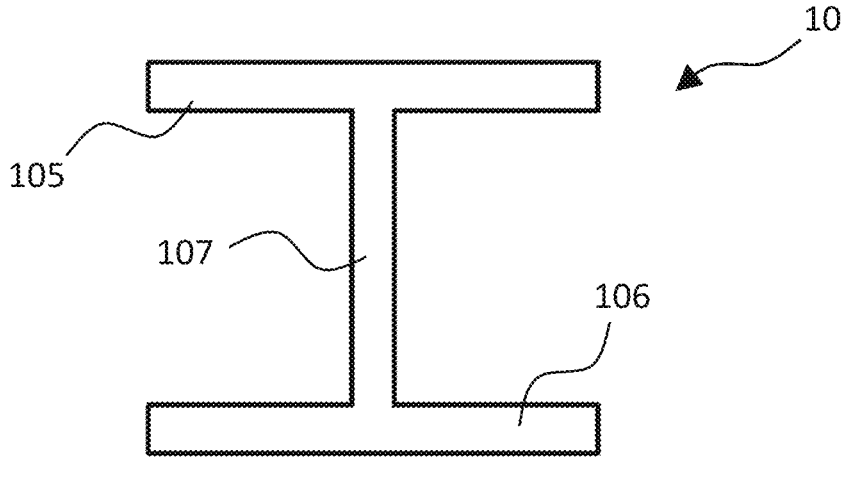
FIG. 5 is a cross-sectional view of the load-carrying member of the aerofoil structure of FIG. 3.

As can be seen from the schematic cross-section shown in FIG. 5, the load-carrying member 10 is formed from an I-beam comprising an upper flange 105 and a lower flange 106 connected by a web 107. In other embodiments, the load-carrying member may have a different cross-sectional shape. For example, the cross-sectional shape of the load-carrying member may be square, rectangular, C-shaped, or Z-shaped, or any other suitable shape.

The load-carrying member 10 has stiffness properties which have been selected such that the aerofoil structure 5 twists in a predefined manner in response to bending of the aerofoil structure 5, similar to the aerofoil structure described in U.S. Ser. No. 17/709,896. More particularly, the stiffness properties of the load-carrying member 10 are selected such that the load-carrying member 10 twists in a twist direction T, about the spanwise Y direction, in response to the load-carrying member 10 being subjected to bending in a bending direction B, about the chordwise direction X. Configured as such, the leading-edge structure 11 rotates downwardly by a predetermined amount in response to an outboard end 7 of the aerofoil structure 5 moving upwardly relative to an inboard end 9 of the aerofoil structure 5 by a particular amount.

According to the present invention, actuators 15A-B are fixedly mounted to the load-carrying member 10, as shown in FIG. 2 and FIG. 3. The actuators 15A-B are operable to bend the load-carrying member 10 to thereby cause the aerofoil structure 5 to twist in a predefined manner.

One end of each actuator 15A-B is connected to a first chordwise member 102A and another end of each actuator 15A-B is connected to a second, neighbouring chordwise member 102B. The first chordwise member 102A being connected to the second chordwise member 102B by a first diagonal member 103A. The actuators 15A-B comprise an upper actuator 15A positioned above a lower actuator 15B. The upper actuator 15A is connected to the respective upper flanges 105 and the respective webs 107 of the respective chordwise members 102A, 102B and the lower actuator 15B is connected to the respective lower flanges 106 and the respective webs 107 of the respective chordwise members 102A, 102B, as shown schematically in FIG. 6, which depicts the ends of the respective actuators 15A-B that are connected to the first chordwise member 102A. However, in some embodiments of the invention at least one actuator may be connected to the upper or lower flange only. In other embodiments of the invention, at least one actuator may be connected to the web only.

Figure 7:
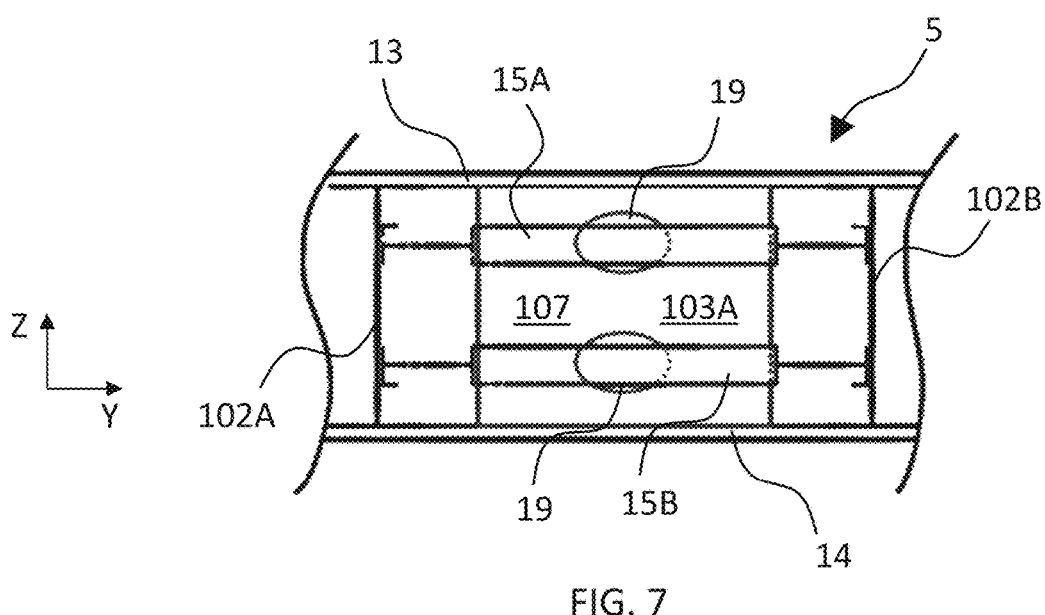
FIG. 7 is a cross-sectional view of the aerofoil structure of FIG. 3 showing the actuators passing through respective openings in the first diagonal member.

As illustrated schematically in FIG. 7, the respective actuators 15A-B pass through respective openings 19 formed in the web 107 of the first diagonal member 103A. In other embodiments of the invention, both actuators may pass through a single, larger opening formed in the diagonal member.

The actuators 15A-B are connected to the load-carrying member 10 via spherical joints 17 which permit the actuators 15A-B to move with respect to the load-carrying member 10 with three rotational degrees of freedom. The spherical joints 17 mitigate the actuators 15A-B constraining rotational movement of the load-carrying member 10, which may cause undesirable stress concentrations where the actuators 15A-15B connect to the load-carrying member or may adversely affect the bend-twist coupling characteristics of the aerofoil structure 5. In other embodiments of the invention other types of joint may be used, and those joints may permit fewer than 3 degrees of rotational freedom of movement.

Figure 6:
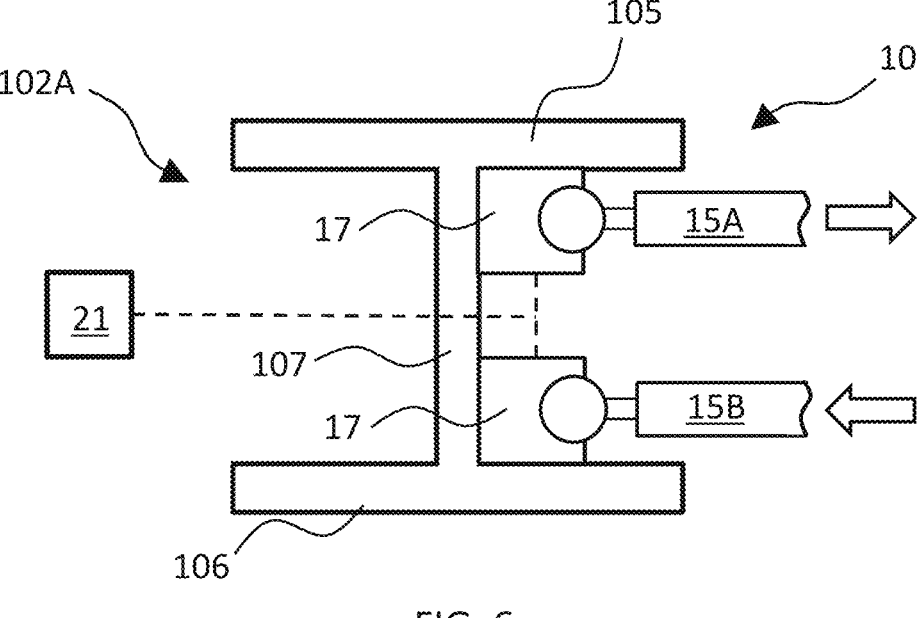
FIG. 6 is a cross-sectional view of the first chordwise member of the load-carrying member of the aerofoil structure of FIG. 3.

The actuators 15A-B are screw-driven actuators (also known as screw jacks). In other embodiments of the invention other suitable types of actuator may be used, such as hydraulic or electro-mechanical actuators. The actuators 15A-B are operable via a control system 21 to extend or retract to thereby either pull the first chordwise member 102A and the second chordwise member 102B towards one another or to push the first chordwise member 102A and the second chordwise member 102B away from one another. In particular, the upper actuator 15A is operated to impose an opposing displacement on the load-carrying 10 member to the displacement imposed by the lower actuator 15B, as illustrated in FIG. 6 in which the block arrows represent the upper actuator 15A retracting and the lower actuator 15B extending to bend the load-carrying member 10 in a manner which causes the outboard end 7 of the aerofoil structure 5 to move upwardly.

Figure 8:
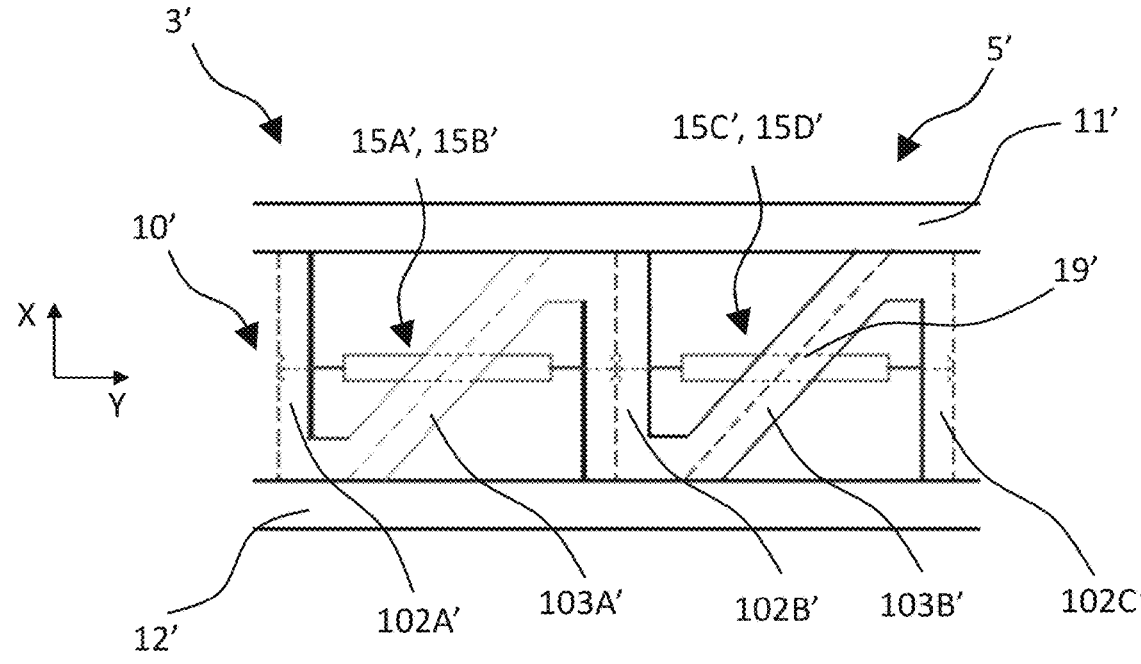
FIG. 8 is a schematic plan view of an aerofoil structure of a wing according to a second embodiment of the invention.

An aerofoil structure 5' of a wing 3' according to a second embodiment of the invention is shown in FIG. 8. The aerofoil structure 5', which is broadly similar to the aerofoil structure 5 described above, comprises a load-carrying member 10' that extends in both a chordwise X direction and a spanwise Y direction of the wing 3'. A leading-edge structure 11' is mounted to a leading-edge side of the load-carrying member 10' and a trailing edge-structure 12' is mounted to a trailing-edge side of the load-carrying member 10'. An upper cover is mounted to an upper side of the load-carrying member 10' and a lower cover is mounted to a lower side of the load-carrying member 10'.

Like the aerofoil structure 5 of the first embodiment, the aerofoil structure 5' comprises a first pair of actuators 15A'-B' connected to the first chordwise member 102A and to the second chordwise member 102B, which neighbours the first chordwise member 102A. The aerofoil structure 5' of the presently described embodiment also comprises a second pair of actuators 15C'-D', as can be seen in FIG. 8. The actuators 15C'-D' comprise an upper actuator 15C' positioned above a lower actuator 15D'. One end of each actuator 15C'-D' is connected to the second chordwise member 102B' and another end of each actuator 15C'-D' is connected to a third, neighbouring chordwise member 102C'. The upper actuator 15C' is connected to the upper flanges of the chordwise members 102B', 102C' and the lower actuator 15D' is connected to the lower flanges of the chordwise members 102B', 102C'. The respective actuators 15C'-D' pass through an opening 19' formed in the web of the second diagonal member 103B, which is situated between the second chordwise member 102B' and the third chordwise member 102C'.

The actuators 15C'-D' are connected to the load-carrying member 10' via spherical joints in substantially the same way as described above with respect to the actuators 15A-B of the aerofoil structure 5 of the first embodiment of the invention. The actuators 15C-D' are linear hydraulic actuators. In other embodiments of the invention other suitable types of actuator may be used. The actuators 15C'-D' are operable via a control system to extend or retract to thereby either pull the second chordwise member 102B' and the third chordwise member 102C' towards one another or to push the second chordwise member 102B' and the third chordwise member 102C' away from one another. In particular, the upper actuator 15C' is operated to impose an opposing displacement on the load-carrying 10 member to the displacement imposed by the lower actuator 15D' to bend the load-carrying member 10' in a manner which causes the outboard end of the aerofoil structure 5' to move upwardly or downwardly.

Figure 9:
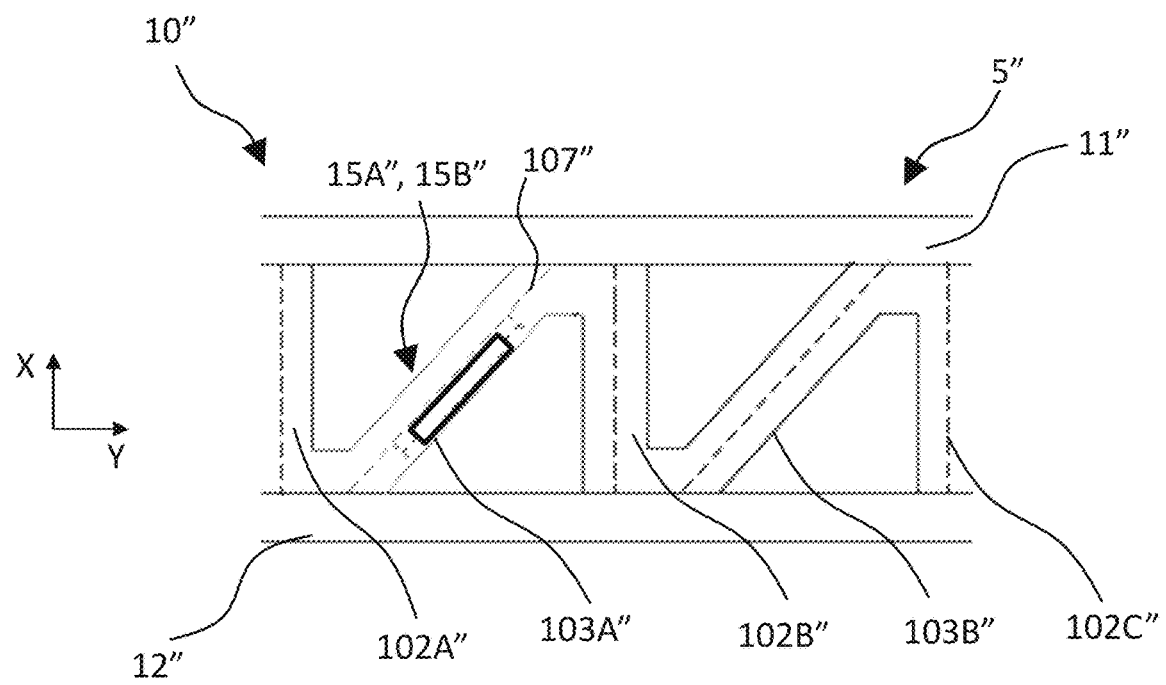
FIG. 9 is a schematic plan view of an aerofoil structure of a wing according to a third embodiment of the invention.

An aerofoil structure 5" of a wing 3" according to a third embodiment of the invention is shown in FIG. 9. The aerofoil structure 5", which is broadly similar to the aerofoil structure 5 of the first embodiment of the invention described above, comprises a load-carrying member 10" that extends in both a chordwise X direction and a spanwise Y direction of the wing 3". A leading-edge structure 11" is mounted to a leading-edge side of the load-carrying member 10" and a trailing edge-structure 12" is mounted to a trailing-edge side of the load-carrying member 10". An upper cover is mounted to an upper side of the load-carrying member 10" and a lower cover is mounted to a lower side of the load-carrying member 10".

Figure 10:
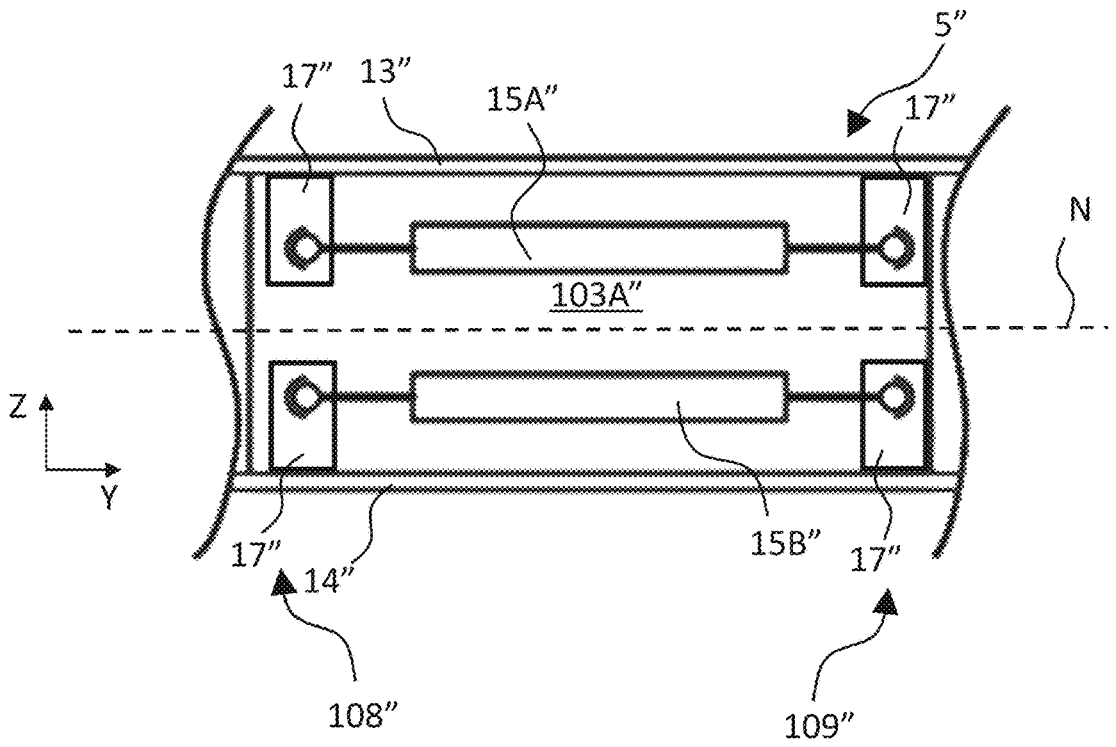
FIG. 10 is a cross-sectional view of the aerofoil structure of FIG. 9 showing the actuators connected to the first diagonal member.

In this case, the aerofoil structure 5" comprises a pair of actuators 15A"-B", both of which are connected to the first diagonal member 103A", which connects the first chordwise member 102A" and the second chordwise member 102B". As can be seen in FIG. 10, the actuators 15A"-B" comprise an upper actuator 15A" positioned above a lower actuator 15B". One end of each actuator 15A"-B" is connected to the first diagonal member 103A" at a first end 108" of the first diagonal member 103A". The other end of each actuator 15A"-B" is connected to the first diagonal member 103A" at a second, opposite end 109" of the first diagonal member 103A". In some embodiments, a second pair of actuators may be positioned on the opposite side of the web 107" of the first diagonal member 103A" to the first pair of actuators 15A"-B". Alternatively, one of the actuators 15A"-B" may be positioned on a first side of the web 107" of the first diagonal member 103A" and the other of the actuators 15A"-B" may be positioned on the second, opposite side of the web 107".

The actuators 15A"-B" are positioned either side of the neutral axis N of the first diagonal member 103A". As will be understood by the skilled person, applying a load to the diagonal member 103A coincident with its neutral axis will not cause the diagonal member to bend.

The actuators 15A"-B" are connected to the load-carrying member 10" via spherical joints 17" in substantially the same way as described above with respect to the actuators 15A-B of the aerofoil structure 5 of the first embodiment of the invention. The actuators 15A"-B" are linear hydraulic actuators. In other embodiments of the invention other suitable types of actuator may be used.

The actuators 15A"-B" are operable via a control system to extend or retract. In particular, the upper actuator 15A" is operated to impose an opposing displacement on the first diagonal member 103A" to the displacement imposed by the lower actuator 15B" to bend the first diagonal member 103A", which causes the outboard end of the aerofoil structure to move upwardly or downwardly. In some embodiments, similarly arranged actuators may also be present on the second diagonal member 103B". In other embodiments, there may be actuators connected to the chordwise members of the load-carrying member in a manner to similar to the actuators 15A-B of the first embodiment of the invention as well as actuators connected to one or more diagonal members in a manner similar to the actuators 15A"-15B".

The wings 3, 3', 3" described above may be operated in accordance with a method according to the invention which comprises operating the actuators 15A-B, 15A'-D', 15A-B" to bend the load-carrying member 10, 10', 10" by a predetermined amount to thereby cause the aerofoil structure 5', 5, 5" to twist by a pre-determined amount to move the leading-edge 11 downwards or upwards. The actuators 15A-B, 15A'-D', 15A-B" may be operated on the ground to achieve a target twist distribution which is optimum for a particular application. For example, the twist of the wing may be adjusted to obtain an optimum fuel burn for a particular mission profile and may be set to that twist for the duration of a mission. Alternatively or additionally, the actuators may be operated in flight. For example, the twist of the wing may be adjusted to an optimal configuration for different phases of flight. In one embodiment, the twist may be adjusted between take-off, cruise, and landing. In a further embodiment, the actuators are part of a closed loop control system and are operable to effect relatively quick changes in the twist distribution of the wing in response to dynamic events such as gust loads or to control aeroelastic effects, such as flutter. It will be understood that the choice of actuator may be determined by application. For example, where changes in wing twist must be effected relatively quickly, hydraulic actuators (or some other actuator able to rapidly effect changes in wing twist) may be preferred. In embodiments of the invention where rapid changes in wing twist are not required, for example, where the wing twist is set on the ground, prior to flight, a screw-driven actuator may be preferred.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing comprising an aerofoil structure, the aerofoil structure comprising:
    a load-carrying member;
    a leading-edge structure forming a leading-edge part of an aerodynamic surface of the aerofoil structure, fixedly mounted to the load-carrying member;
    a trailing-edge structure forming a trailing edge part of the aerodynamic surface, fixedly mounted to the load-carrying member;
    wherein:
        the load-carrying member comprises a beam formed by a first chordwise member, a second chordwise member, and a diagonal member connected in series;
        the first chordwise member extends from the trailing-edge structure to the leading-edge structure;
        the second chordwise member extends from the trailing-edge structure to the leading-edge structure, the second chordwise member being spaced apart from the first chordwise member in a spanwise direction;
        the diagonal member extends both in the spanwise direction and in a chordwise direction from the trailing-edge structure to the leading-edge structure and connects the first chordwise member and the second chordwise member;
        the load-carrying member has stiffness properties selected such that the load-carrying member twists in a predefined manner in response to bending of the load-carrying member; and
        the aerofoil structure further comprises a first actuator which is fixedly mounted to the load-carrying member and which extends to bend the load-carrying member to thereby cause the load-carrying member to twist.

2. The aircraft wing according to claim 1, wherein a first end and a second end of the first actuator are fixedly mounted to the load-carrying member and the first actuator is configured to move the first end with respect to the second end to impose a displacement on the load-carrying member to thereby bend the load-carrying member.

3. The aircraft wing according to claim 2, wherein the beam has a lower flange and an upper flange connected by a web, and at least one of the first end or the second end of the first actuator is fixedly mounted to the lower flange, the upper flange, or to the web.

4. The aircraft wing according to claim 2, wherein at least one of the first end or the second end of the first actuator is fixedly mounted to the load-carrying member via a joint which permits the at least one end of the actuator to move with at least two rotational degrees of freedom with respect to the load-carrying member.

5. The aircraft wing according to claim 2, wherein the first end and the second end of the first actuator are fixedly mounted to the diagonal member.

6. The aircraft wing according to claim 2, wherein the first end of the first actuator is fixedly mounted to the first chordwise member and the second end of the first actuator is fixedly mounted to the second chordwise member.

7. The aircraft wing according to claim 2, comprising a second actuator, wherein the first end and the second end of the first actuator are fixedly mounted to the load-carrying member towards an upper cover;

a first end and a second end of the second actuator are fixedly mounted to the load-carrying member towards a lower cover; and the second actuator is operable to impose an opposing displacement on the load-carrying member to the displacement imposed by the first actuator.

8. The aircraft wing according to claim 7, wherein the first end and the second end of the first actuator are fixedly mounted to the diagonal member, and wherein the first end and the second end of the second actuator are fixedly mounted to the diagonal member.

9. The aircraft wing according to claim 7, wherein the first end of the first actuator is fixedly mounted to the first chordwise member and the second end of the first actuator is fixedly mounted to the second chordwise member, and wherein the first end of the second actuator is fixedly mounted to the first chordwise member and the second end of the second actuator is fixedly mounted to the second chordwise member.

10. The aircraft wing according to claim 1, wherein the aerofoil structure further comprises an upper cover fixedly mounted to the load-carrying member and a lower cover fixedly mounted to the load-carrying member, the upper cover forming an upper part of the aerodynamic surface and the lower cover forming a lower part of the aerodynamic surface.

11. The aircraft wing according to claim 1, wherein the aerofoil structure is positioned between a fuel tank and a tip of the wing.

12. An aircraft comprising the aircraft wing according to claim 1 and a control system, wherein the control system is configured to operate the first actuator to cause the aircraft wing to twist by a predefined amount.

13. The aircraft of claim 12, wherein the control system is configured to operate the first actuator to bend the load-carrying member by a predetermined amount.

14. The aircraft of claim 13, wherein the predetermined amount of bending of the load-carrying member is selected from a plurality of values, each value corresponding to a different predetermined twist configuration of the aircraft wing.

\* \* \* \* \*